UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF PRODUCING AMMONIA.

1,092,167.   Specification of Letters Patent.   Patented Apr. 7, 1914.

No Drawing.   Application filed December 10, 1912. Serial No. 736,041.

*To all whom it may concern:*

Be it known that I, SAMUEL PEACOCK, a citizen of the United States, residing at Chicago, in the county of Cook and State of Illinois, have invented certain new and useful Improvements in Processes of Producing Ammonia; and I do hereby declare the following to be a full, clear, and exact description of the invention, such as will enable others skilled in the art to which it appertains to make and use the same.

The present invention relates to a process of producing ammonia from metallic hydrids and nitrids, and has for its object to provide a process which will be cyclic in operation and one that will continuously produce this product at a less cost than those heretofore proposed.

With these and other objects in view, the invention consists in the novel steps and combinations of steps constituting my process, all as will be hereinafter disclosed and particularly pointed out in the claim.

In carrying out my process, I take a suitable metallic hydrid such as $FeH_3$, and a suitable metallic nitrid, such as $Fe_2N_2$, and cause the hydrogen of the one or the nitrogen of the other, to be chemically liberated in the presence of free nitrogen or free hydrogen, as the case may be, under conditions suitable for the formation of ammonia, as will presently appear.

I am aware that the direct synthesis of nitrogen and hydrogen by combining the free gases $N_2$ and $H_2$ has been accomplished by means of high pressures in the presence of catalysts, but my invention differs from such procedures as will be clear from the following: As is well known, at comparatively low temperatures of say 800° C. to 1000° C., ammonia $NH_3$ is largely dissociated, and it follows that in a direct synthesis process of nitrogen $N_2$ and hydrogen $H_2$, the added heat due to the formation of this ammonia, is sufficient to seriously check the progress of the process. By my process, on the other hand, ammonia is formed only as a reaction product in the dissociating or breaking of a hydrid or a nitrid requiring the absorption of heat; the heat absorbed during such dissociation thus serving to obviate wholly or in part, the danger of a dissociation of the simultaneously formed ammonia by its own liberated heat of formation.

My process will be more clear from the following equations illustrating both the hydrid and the nitrid reactions. But, of course, it should be remembered that the valency of metal compounds of this nature is often materially influenced by pressures and temperatures, and further, that valency conditions are also often influenced by the mobile conditions of the atoms.

Ferrous oxid and ferric oxid form hydrids and nitrids, as follows:—

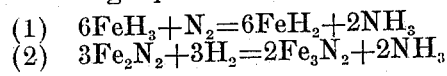

It is known that a considerable quantity of heat disappears in converting the higher hydrids and nitrids to the lower forms, and in such conversion, some of the hydrogen and nitrogen is of course freed in a highly chemically active condition, sometimes called the nascent state. When in such condition, the said hydrogen will combine with free nitrogen, and the said nitrogen will combine with free hydrogen under suitable conditions, to form ammonia in accordance with the following equations:—

(1)  $6FeH_3 + N_2 = 6FeH_2 + 2NH_3$
(2)  $3Fe_2N_2 + 3H_2 = 2Fe_3N_2 + 2NH_3$

In order that the reaction should be cyclic, however, it is evident that the higher hydrids or nitrids should be reformed as fast as they break up to give rise to the lower hydrids and nitrids. Accordingly, whether hydrids or nitrids, or both, are employed, I feed free nitrogen and hydrogen in suitable proportions into the furnace, and so regulate the temperature as to bring about the following reactions simultaneously with the above reactions:—

(1)  $6FeH_2 + 3H_2 = 6FeH_3$
(2)  $2Fe_3N_2 + N_2 = 3Fe_2N_2$

Thus the process becomes cyclic and continuous so long as the supply of free hydrogen and nitrogen is maintained. The gases of the reaction are suitably drawn off, and the ammonia collected in any suitable and well known manner.

In bringing about the above reactions, I prefer to expose the metal hydrids to the action of the free hydrogen and nitrogen by arranging these salts in thin layers in a suitable muffle or other furnace, which should be so fitted with closures as to protect the charge from air or vapors containing free oxygen, or from any compounds containing oxygen which are readily reducible, such for example, as steam or water vapor, carbon dioxid, etc.

In order to obtain the hydrids, I preferably form the same by treating spongy iron with hydrogen, and I preferably form the nitrids by treating the spongy iron with nitrogen both at well known suitable temperatures, or I may form the hydrids by treating iron oxid at suitable temperatures with hydrogen, and I may form the nitrids by treating a mixture of iron oxid and carbon with free nitrogen. In the first instance, water gas may be used as the source of hydrogen, and in the second instance, the nitrogen associated with producer gas may be employed.

It is obvious of course, that other metallic hydrids and nitrids than those above mentioned may be produced, and it will further be evident to chemists that in each particular case, the heats of formation and of dissociation will have to be considered in carrying out the process.

It is obvious that those skilled in the art may vary the above steps without departing from the spirit of my invention, and therefore, I do not wish to be limited to the above disclosure except as may be required by the claim.

What I claim is:—

The cyclic process of producing ammonia from a higher iron hydrid in the presence of free nitrogen which consists in causing said higher iron hydrid to split off a portion of its hydrogen at temperatures suitable for the nascent hydrogen thus produced to combine with said free nitrogen to form ammonia and simultaneously feeding free hydrogen to the mass to reform said higher iron hydrid as fast as said ammonia is produced, substantially as described.

In testimony whereof, I affix my signature, in presence of two witnesses.

SAMUEL PEACOCK.

Witnesses:
  MARGARET E. CHESTER,
  MAY E. KIMMITT.